April 3, 1945.  H. P. PHILLIPS  2,372,979
PISTON RING
Filed April 30, 1942

INVENTOR.
Harold P. Phillips
BY
Earl D. Chappell

Patented Apr. 3, 1945

2,372,979

UNITED STATES PATENT OFFICE 2,372,979

PISTON RING

Harold P. Phillips, Hastings, Mich., assignor to Hastings Manufacturing Company, Hastings, Mich.

Application April 30, 1942, Serial No. 441,140

4 Claims. (Cl. 309—45)

This invention relates to improvements in piston rings.

The main objects of this invention are:

First, to provide a one-piece oil ring which is highly desirable for use in internal combustion engines and effective as a replacement ring in engines commonly designated as "oil pumpers."

Second, to provide a piston ring of the scraper type having a comparatively high unit pressure which is maintained throughout the effective life of the ring.

Third, to provide a piston ring having these advantages which may be very economically produced.

Objects relating to details and economies of the invention will definitely appear from the description to follow. The invention is defined in the claims.

A structure which embodies the features of the invention is clearly illustrated in the accompanying drawing, in which.

Figure 1:
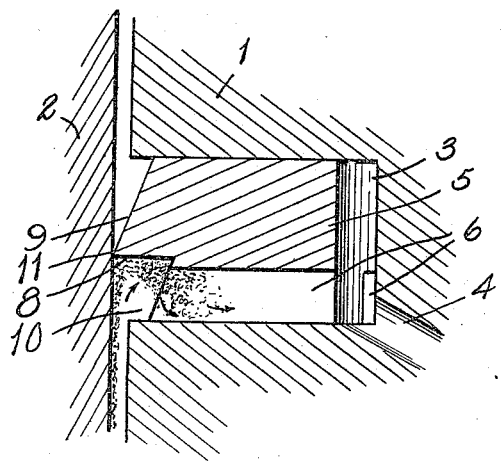
Fig. 1 is a fragmentary longitudinal section of a cylinder and coacting piston with a piston ring embodying my invention installed in the oil ring groove of the piston, no attempt being made to illustrate the parts in their proper proportions, the clearances of the piston in relation to the cylinder, or the piston ring in relation to the walls of the piston ring groove.
Figure 2:
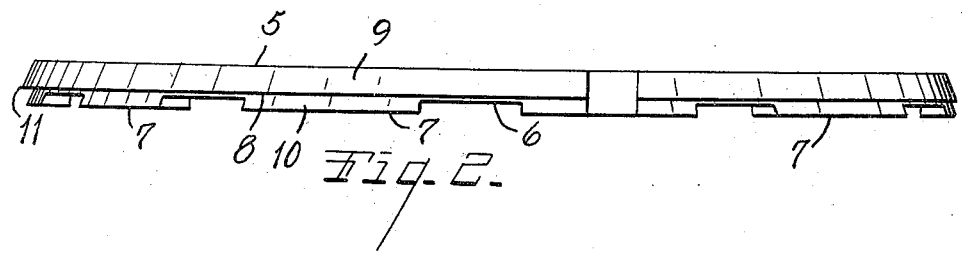
Fig. 2 is an edge view of my improved piston ring.

My present invention relates to a piston ring of the one-piece split expansible cast iron type as distinguished from multiple piece piston rings such as shown, for example, in my Patent No. 2,148,997, issued February 28, 1939.

In the accompanying drawing the reference numeral 1 indicates the piston of an internal combustion engine and 2 the cylinder thereof. The piston is provided with an annular piston ring groove 3 with drain openings 4 leading from the bottom thereof to the interior of the piston.

My improved piston ring 5 is of the split expansible type, preferably formed of cast iron, although if desired harder or more wear resistant metals may be employed. The upper and lower sides of the ring are parallel, the lower side having a plurality of peripherally spaced oil drainage slots or passages installed or otherwise formed therein. The periphery of the ring is divided by a radial step 8 forming lands 9 and 10. Both of these lands are upwardly beveled or inclined, the angle being preferably the same and approximately 22 degrees. This angle of approximately 22 degrees has been found very effective for the functions performed and does not objectionably cut away or weaken the ring. The axial width of the land 9 is substantially greater than that of the land 10.

The extreme lower edge of the land 9 constitutes a relatively sharp scraper edge 11 which is of substantially greater radius than the outermost extremity or portion of the lower land 10 so that at no time during the normal life of the ring will the lower land or any portion thereof come into contact with the cylinder wall. I am aware that stepped piston rings have been designed in which high points of the steps are successively brought into engagement with the cylinder wall and which are designed ultimately to all constitute cylinder wall engaging portions. This is designed to provide quick wearing-in of the relatively sharp cylinder wall engaging edges, but at the same time it results in successive reduction of the unit pressure. It is a feature of my invention to maintain relatively high unit pressure throughout the normal life of the ring and at the same time to provide for quick wearing-in and effective scraper action during the life of the ring. It will be noted that the step 8 is at right angles to the axis of the ring or, in other words, parallel to the sides of the ring.

While the wear of the cylinder contacting portion may be quite substantial during the life of the ring, quite an effective scraping action is maintained owing to the angle of the step 8 to the cylinder wall contacting edge, and considerable wear must take place before the unit pressure is seriously affected.

Another advantage is that the radial width of the land 10 at all portions thereof is substantially less than that of the cylinder wall contacting portion of the land 9 so that it provides an oil collecting groove of substantial capacity. The passages 6 open to the bottom of this groove so that a very considerable volume of oil may be accommodated. Beveling of the land 10 increases the area of the side portions 7 between the grooves 6, thereby substantially increasing the wear area for the lower side of the ring.

Another advantage obtained by the above structure is in the improved manner of draining the oil radially through the passages 6 to the interior of the oil ring as follows: In the operation of a piston at the high velocities characterizing its operation in modern engines, the oil ring is reciprocating at an extremely high linear velocity, carrying the oil which it scrapes from the cylinder wall with it at the same velocity. As this oil is moved downwardly by the scraping edge of the oil ring it also has a radially inward motion imparted thereto at a considerable velocity in a direction away from the scraping edge.

It is desirable to allow free passage of the oil under such radial velocity for as great a distance inwardly as is possible before any sort of mechanical obstruction is reached. In a conventional oil scraper ring having an oil recess of rectangular section the kinetic force of the radially traveling oil engaging the ring at high velocity is often sufficient to actually compress the ring, shifting the same away from the cylinder wall and thus interrupting, at least momentarily, its scraping action. The recent development of high speed automotive engines has demonstrated that this characteristic action is a very objectionable factor, though it did not present itself previously in the slower speed engines previously employed. With this in mind, it will be seen that the feature of beveling the lower peripheral surface 10 upwardly and inwardly to the inner limit of the radial step 8 considerably increases the radial distance over which the oil travels along the top wall of the groove prior to coming into contact with the said beveled surface or any point thereon.

I have attempted to illustrate this radial inward flow of the oil on the downward reciprocation of the piston in Fig. 1, the direction of flow being indicated by the arrows. It is apparent that a substantially longer inward travel is made possible than were the lower edge of the ring cut or machined in the form of a rectangle, forming an oil recess of equivalent capacity or volume. This, of course, ties in with the above mentioned advantage of increased stability of support resulting from the upward and inward beveling of the lower peripheral surface 10 which was discussed above. The increased length of the path of travel of the oil inwardly is not obtained by sacrificing stability of support on the lower side of the ring.

I have mentioned that the beveled surfaces 9, 10 have preferably an equal inclination from the vertical. The reason for this is that in machining the rings externally to form and finish said surfaces it is possible to assemble a plurality of rings concentrically in a stack and subject the same simultaneously to machining by a special formed tool or gang of tools, each similar and providing a saw tooth-like cutting edge. Any given tool of such a gang simultaneously cuts the upper beveled surface 9 of one ring or ring blank and the lower beveled surface 10 of an immediately adjacent ring or ring blank as a straight line continuation of the first named surface. This greatly simplifies and expedites the machining process and makes for absolute uniformity of output.

I have illustrated and described the invention in an embodiment which I have found satisfactory. I have not attempted to illustrate other adaptations of the invention which are possible as it is believed the disclosure made will enable those skilled in the art to practice my invention as desired.

Having thus described my invention what I claim as new and desire to secure by Letters Patent is:

1. A split annular expansible cast iron piston ring having parallel top and bottom ring groove engaging sides and provided with upper and lower upwardly beveled lands, the axial width of the upper land being substantially greater than that of the lower land, the bevels of each extending entirely across the lands and being at the same angle to the axis of the ring, the upper edge of the upper bevel and the lower edge of the lower bevel being the same distance from the axis of the ring, the upper land terminating at its lower extremity in an annular scraper edge, the radial width of the lower land at its greatest dimension being substantially less than the radial width of the upper land through a substantial portion of the axial thickness thereof so that no point of the lower land will engage the cylinder wall during the effective life of the ring, the lower land constituting an oil collecting groove of substantial depth, the lower side of the ring having a plurality of spaced drainage passages therein opening to said oil collecting groove and to the inside of the ring.

2. A split annular expansible piston ring provided with a plurality of oil drainage passages on its lower surface extending radially therethrough, the outer periphery of said ring being provided with upper and lower lands beveled upwardly and inwardly of the axis of the ring at an angle of approximately 22 degrees, the upper edge of the upper bevel and the lower edge of the lower bevel being the same distance from the axis of the ring, said upper land being of substantially greater axial dimension than the lower and terminating at its lower extremity in an annular cylindrical wall scraper edge, the lower land being of substantially less radial width than the upper land so as not to engage the cylinder during the effective life of the ring, said lands being separated by a radial step defining with the lower land an oil collection groove of substantial volume with which said oil drainage passages communicate, the inclination of said lower land affording a substantial wear area for the ring on the lower side surface, the bevel of the upper land extending to the upper surface of the ring and the bevel of the lower land extending to the lower surface of the ring.

3. A split annular expansible piston ring of cast iron provided on its outer periphery with upper and lower beveled lands inclined approximately equally upwardly and inwardly of the axis of the ring at an angle of approximately 22 degrees, the upper edge of the upper bevel and the lower edge of the lower bevel being the same distance from the axis of the ring, said upper land having at its lower side a knife-like annular scraping edge engaging the wall of a cylinder in which a piston carrying said ring operates, said lower land being disposed at its outermost point sufficiently inwardly of said knife edge that no point thereon will engage the cylinder wall during the effective life of the ring, the bevel of the upper land extending to the upper surface of the ring and the bevel of the lower land extending to the lower surface of the ring.

4. A split annular expansible piston ring provided on its outer periphery with upper and lower beveled lands inclined approximately equally upwardly and inwardly of the axis of the ring, the upper edge of the upper bevel and the lower edge of the lower bevel being the same distance from the axis of the ring, said upper land having at its lower side an annular scraping portion engaging the wall of a cylinder in which a piston carrying said ring operates, said lower land being disposed at its outermost point sufficiently inwardly of said portion that no point thereon will engage the cylinder wall during the effective life of the ring, the bevel of the upper land extending to the upper surface of the ring and the bevel of the lower land extending to the lower surface of the ring.

HAROLD P. PHILLIPS.